United States Patent

[11] 3,633,605

| [72] | Inventor | Larry S. Smith<br>Goshen, Ind. |
|---|---|---|
| [21] | Appl. No. | 808,256 |
| [22] | Filed | Mar. 18, 1969 |
| [45] | Patented | Jan. 11, 1972 |
| [73] | Assignee | Robertshaw Controls Company<br>Richmond, Va. |

[54] PNEUMATIC CONTROL SYSTEM AND PNEUMATIC CONTROL DEVICE THEREFOR OR THE LIKE
14 Claims, 4 Drawing Figs.

[52] U.S. Cl. .................................... 137/113,
137/512.15, 137/525
[51] Int. Cl. .................................... F16k 15/14,
F16k 27/00
[50] Field of Search ........................... 137/113,
116.5, 525, 512.15; 251/367, 368

[56] References Cited
UNITED STATES PATENTS

| 3,065,761 | 10/1962 | Peras | 137/525 |
|---|---|---|---|
| 3,084,707 | 4/1963 | Frye | 137/525 |
| 3,245,426 | 4/1966 | Kreuter | 137/525 |
| 3,260,274 | 7/1966 | Morgan | 137/113 |
| 3,345,034 | 10/1967 | Sherman | 251/367 |
| 3,465,786 | 9/1969 | Spisak | 137/512.15 |

Primary Examiner—Samuel B. Rothberg
Assistant Examiner—William H. Wright
Attorneys—Auzville Jackson, Jr., Robert L. Marben and Candor, Candor & Tassone ABSTRACT: A pneumatic control device comprising two cup-shaped housing members respectively having open ends and end wall means recessed from the respective open ends thereof, each end wall means having an inlet therein and a valve seat surrounding the respective inlet and projecting beyond its respective end wall means toward the open end of its respective housing member. The housing members are secured together in a snap-fit relation with the open ends thereof telescoped together. A flexible diaphragm has an outer peripheral means thereof secured between the open end of one of the housing members and the end wall means of the other housing member, the diaphragm being movable between and being selectively engageable with said valve seats and having an opening means passing therethrough outboard of the valve seats and always disposed in fluid communication with an outlet of the control device.

INVENTOR.
LARRY S. SMITH

BY

*Cauds, Cauds & Tassne*

HIS ATTORNEYS

PNEUMATIC CONTROL SYSTEM AND PNEUMATIC CONTROL DEVICE THEREFOR OR THE LIKE

This invention relates to a pneumatic control system as well as to an improved pneumatic control device for such a system or the like.

It is well known from U.S. Pat. No. 3,245,426 that a pneumatic control system can be provided wherein a pneumatic control device can receive two pneumatic input signals and transmit the higher pressure of the two input signals to a pneumatic signal-receiving means, the control device having two opposed valve seats respectively fluidly interconnected to the input signals and being controlled by a flexible diaphragm disposed therebetween and having an opening passing therethrough outboard of the valve seats so that the opening is always disposed in fluid communication with an outlet of the control device that is disposed outboard of the valve seats and is disposed in fluid communication with the signal receiving means.

One of the features of this invention is to provide an improved control device of the above type which is economical to produce and simple in design.

In particular, one embodiment of this invention provides a control device having two cup-shaped housing members respectively provided with open ends and end wall means recessed from the respective open ends thereof, each end wall means having an inlet therein and a valve seat surrounding the respective inlet and projecting beyond the respective end wall means toward the open end of its respective housing member. The housing members are snap-fitted together with the open ends thereof disposed in telescoped relation. A flexible diaphragm has its outer peripheral means secured between the open end of one of the housing members and the end wall means of the other housing member, the diaphragm being movable between and being selectively engageable with the valve seats while having an opening passing therethrough outboard of the valve seats and always disposed in fluid communication with an outlet of the control device.

Accordingly, it is an object of this invention to provide an improved control device having one or more of the novel features set forth above or hereinafter shown or described.

Another object of this invention is to provide an improved pneumatic control system utilizing such a control device or the like.

Other objects, uses, and advantages of this invention are apparent from a reading of this description which proceeds with reference to the accompanying drawings forming a part thereof and wherein.

Figure 1:
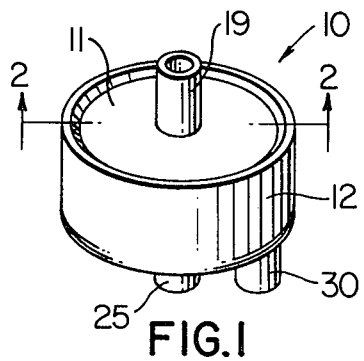
FIG. 1 is a top perspective view of the improved control device of this invention.

While the various features of this invention are hereinafter described and illustrated as being particularly adapted to provide means for transmitting the higher pressure of two pneumatic input signals to a pneumatic signal receiving means, it is to be understood that the various features of this invention can be utilized singly or in any combination thereof to provide control means for other systems as desired.

Therefore, this invention is not to be limited to only the embodiment illustrated in the drawings, because the drawings are merely utilized to illustrate one of the wide variety of uses of this invention.

Referring now to FIGS. 1-4, the improved control device of this invention is generally indicated by the reference numeral 10 and comprises two cup-shaped housing members 11 and 12 cooperating together in a manner hereinafter described to secure a flexible diaphragm 13 therebetween.

The housing member 11 has an open end 14 and an end wall means 15 recessed from the open end 14 thereof. An annular valve seat 16 projects from the end wall means 15 toward the open end 14 and surrounds an inlet 17 that interrupts the end wall means 15 and is disposed in fluid communication with a passage means 18 that passes through an integral nipple extension 19 of the housing member 11.

Similarly, the housing member 12 has an open end 20 and an end wall means 21 recessed from the open end 20. An annular valve seat 22 projects from the end wall means 21 toward the open end 20 of the housing member 12 and surrounds an inlet 23 interrupting the end wall 21 and being disposed in fluid communication with a passage means 24 formed in an integral nipple extension 25 of the housing member 12.

The end wall means 21 of the housing member 12 has a stepped shoulder 26 provided with an annular groove 27 therein. The end wall means 21 of the housing member 12 is also interrupted by an outlet 28 disposed outboard of the valve seat 22 and disposed in fluid communication with a passage means 29 passing through an integral nipple extension 30 of the housing member 12.

An annular groove 31 is formed in the internal peripheral surface 32 of the housing member 12 adjacent the open end 20 thereof and is disposed inboard of an annular beveled surface 33 at the open end 20 of the housing member 12.

Figure 2:
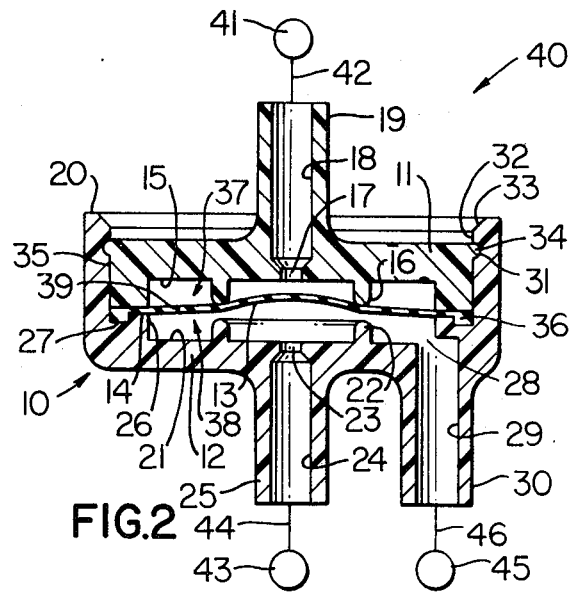
FIG. 2 is an enlarged cross-sectional view of the control device of FIG. 1 and is taken on line 2—2 of FIG. 1.
Figure 4:
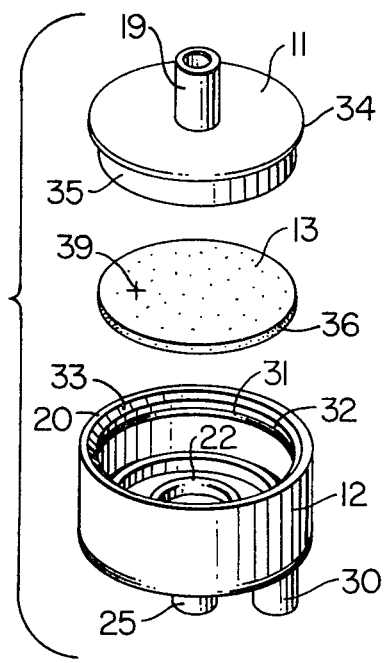
FIG. 4 is an exploded perspective view of the various parts forming the control device of FIG. 1.

A complementary annular rib 34 projects outwardly from the outer peripheral surface 35 of the housing member 11 adjacent its end wall means 15 so that the housing member 11 is adapted to have its open end 14 cammed into the open end 20 of the housing member 12 as illustrated in FIG. 2 and be further telescoped therein so that the annular rib 34 will subsequently be snap-fittingly received in the annular groove 31 of the housing member 12 to secure the housing members 11 and 12 together in the telescope relation illustrated in FIG. 2.

The flexible diaphragm 13 has an outer peripheral means or bead 36 adapted to be received in the annular groove 27 in the end wall means 21 of the housing member 12 so that when the housing members 11 and 12 are disposed in their snap-fit relation, the open end 14 of the housing member 11 compresses the outer peripheral means 36 of the flexible diaphragm 13 against the end wall means 21 of the housing member 12 to not only secure and seal the outer peripheral means 36 of the flexible diaphragm 13 to the interconnected housing members 11 and 12, but also to divide the interior of the interconnected housing members 11 and 12 into two chambers 37 and 38.

However, the flexible diaphragm 13 has an opening means 39 passing therethrough in such a manner that the opening means 39 is disposed outboard of both valve seats 16 and 22 so as to fluidly interconnect the chambers 37 and 38 together in a manner hereinafter described.

Therefore, it can be seen that the control device 10 of this invention is formed of only three parts 11, 12 and 13 and the housing members 11 and 12 can be formed from molded plastic material or the like in a simple and economical manner, the parts 11, 12 and 13 being adapted to be readily snap-fitted together without any auxiliary fastening means or sealing means to produce a control device 10 that will operate in a manner hereinafter described.

Figure 3:
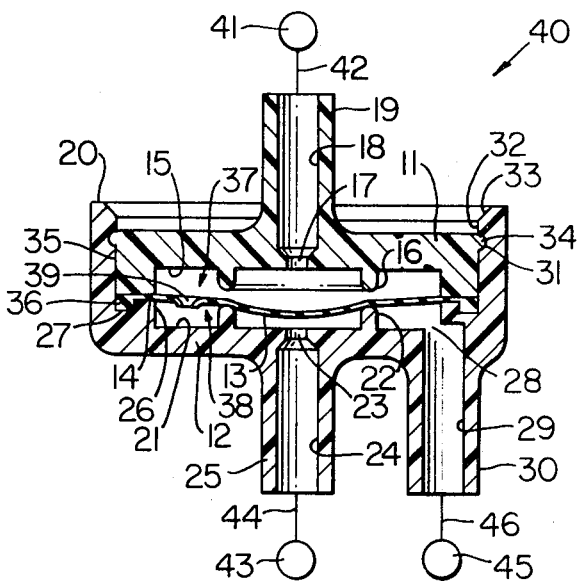
FIG. 3 is a view similar to FIG. 2 and illustrates the control device in another operating position thereof.

For example, the control device 10 of this invention can be utilized in a control system that is generally indicated by the reference numeral 40 in FIGS. 2 and 3 and is now to be described.

As illustrated in FIGS. 2 and 3, a first input signal source 41 is adapted to be fluidly interconnected to the inlet 17 by a conduit means 42 coupled to the nipple extension 19 of the control device 10. Similarly, a second pneumatic signal source 43 is adapted to be fluidly interconnected to the inlet 23 of the control device 10 by a conduit means 44 coupled to the nipple extension 25. A pneumatic signal-receiving device or means 45 is adapted to be disposed in fluid communication with the outlet 28 by a conduit means 46 coupled to the nipple extension 30 of the control device 10.

In this manner, the control device 10 will always transmit the higher pressure signal of the two signal sources 41 and 43 to the pneumatic signal-receiving means For example, when the pneumatic pressure of the pneumatic signal being directed by the source 43 to the inlet 23 of the control device 10 is greater than the pressure of the pneumatic signal being transmitted to the inlet 17 by the other source 41, the resulting pressure differential acting across the diaphragm 13 causes the diaphragm 13 to move upwardly as illustrated in FIG. 2 and seal against the valve seat 16 to prevent fluid communication between the inlet 17 and the opening 39 in the diaphragm 13. Also, with the diaphragm 13 being disposed in sealing engagement with the valve seat 16, the flexible diaphragm 13 is disposed out of engagement with the valve seat 22 so that the inlet 23 is disposed in fluid communication with the chamber 38 and, thus, to the outlet 28 whereby the pneumatic signal source 43 is interconnected to the pneumatic signal-receiving means 45 as long as the pressure of the pneumatic source 43 is greater then the pressure of the pneumatic source 41.

However, when the pressure of the pneumatic signal being directed by the source 41 to the inlet 17 of the control device 10 is greater than the pressure of the pneumatic signal being directed by the source 43 to the inlet 23 of the control device 10, the resulting pressure differential acting across the diaphragm 13 moves the diaphragm 13 downwardly, as illustrated in FIG. 3, to seal against the valve seat 22 and open the valve seat 16 so that the higher pressure pneumatic signal in the chamber 37 can pass through the opening 39 in the diaphragm 13 and enter the chamber 38 and, thus, pass out through the outlet 28 to the pneumatic signal receiving means 45.

Thus, it can be seen that the control device 10 can readily switch the pneumatic-receiving device 45 to the pneumatic signal source 41 or 43 which has a pressure greater than the other in a simple and effective manner for the reasons fully set forth in the prior mentioned U.S. Pat. No. 3,245,426.

Accordingly, it can be seen that this invention not only provides an improved pneumatic control system, but also this invention provides an improved pneumatic control device that is relatively inexpensive to manufacture and assemble while still being accurate in its control function.

I claim:

1. A pneumatic control device comprising two cup-shaped housing members respectively having circular open ends and circular end wall means recessed from the respective open ends thereof, one of said housing members having said open end thereof defined by an annular flat wall, the other of said housing members having said end wall means thereof outwardly stepped to define an annular grooved shoulder at the outer periphery of said circular end wall means thereof, each end wall means having an inlet therein and substantially centrally interrupting the respective end wall means and an annular valve seat substantially concentrically surrounding the respective inlet and projecting beyond its respective end wall means toward the open end of its respective housing member in radial spaced relation from the respective inlet, said housing members having means snap-fitting the same together with said open ends thereof telescoped together, and a flexible diaphragm having outer peripheral means thereof secured and compressed between said annular flat wall of said one housing member and said annular groove shoulder of the other housing member solely by the snap-fit relation of said housing member, said diaphragm being movable between and being selectively engageable with said valve seats.

2. A pneumatic control device as set forth in claim 1 wherein said means snap-fitting said housing members together comprises an annular groove in one of said housing members and a cooperating annular rib on the other housing member.

3. A pneumatic control device as set forth in claim 2 wherein said annular groove is adjacent the open end of its respective housing member and said annular rib is adjacent the end wall means of its respective housing member.

4. A pneumatic control device as set forth in claim 3 wherein the housing member having said annular groove 5. A pneumatic control device as set forth in claim 1 wherein said outer peripheral means of said flexible diaphragm has an annular bead received in the groove of said annular groove shoulder of said other housing member.

6. A pneumatic control device as set forth in claim 1 wherein one of said housing members has an outlet in the end wall means thereof, said outlet being disposed outboard of said valve seat of said one housing member.

7. A pneumatic control device as set forth in claim 6 wherein said diaphragm has an opening therethrough that is disposed outboard of said valve seats of said housing members.

8. A pneumatic control device as set forth in claim 6 wherein said housing members have integral nipple extensions respectively communicating with said inlets and said outlets.

9. In a pneumatic control system having two pneumatic input signal sources and a pneumatic signal receiving means, the improvement comprising a pneumatic control for receiving said input signals and transmitting the higher pressure of the two to said pneumatic signal receiving means, said pneumatic control device comprising two cup-shaped housing members respectively having circular open ends and circular end wall means recessed from the respective open ends thereof, one of said housing members having said open end thereof defined by an annular flat wall, the other of said housing members having said end wall means thereof outwardly stepped to define an annular grooved shoulder at the outer periphery of said circular end wall means thereof, each end wall means having an inlet therein and substantially centrally interrupting the respective end wall means and an annular valve seat substantially concentrically surrounding the respective inlet and projecting beyond its respective end wall means toward the open end of its respective housing member in radial spaced relation from the respective inlet, said housing members having means snap-fitting the same together with said open ends thereof telescoped together, one of said housing members having an outlet outboard of said valve seats, means fluidly interconnecting said input signal sources respectively to said inlets and said pneumatic signal-receiving means to said outlet, and a flexible diaphragm having outer peripheral means thereof secured and compressed between said annular flat wall of said one housing member and said annular grooved shoulder of the other housing member solely by the snap-fit relation of said housing members, said diaphragm having opening means passing therethrough outboard of said valve seats and being movable between and selectively engageable with said valve seats.

10. In a pneumatic control system as set forth in claim 9, the further improvement wherein said means snap-fitting said housing members together comprises an annular groove in one of said housing members and a cooperating annular rib on the other housing member.

11. In a pneumatic control system as set forth in claim 10, the further improvement wherein said annular groove is adjacent the open end of its respective housing member and said annular rib is adjacent the end wall means of its respective housing member.

12. In a pneumatic control system as set forth in claim 11, the further improvement wherein the housing member having said annular groove therein telescopically receives the open end of the other housing member in its said open end.

13. In a pneumatic control system as set forth in claim 9, the further improvement wherein said outer peripheral means of said flexible diaphragm has an annular bead received in the groove of said annular grooved shoulder of said other housing member.

14. In a pneumatic control system as set forth in claim 9, the further improvement wherein one of said housing members has said outlet in the end wall means thereof, said outlet being disposed outboard of said valve seat of said one housing member.

* * * * *